United States Patent [19]
Schroeter

[11] 3,715,401
[45] Feb. 6, 1973

[54] PROCESS FOR PRODUCING 3-HYDROXYALKYL ETHERS

[75] Inventor: Siegfried H. Schroeter, Schenectady, N.Y.

[73] Assignee: General Electric Company

[22] Filed: May 1, 1970

[21] Appl. No.: 33,903

Related U.S. Application Data

[63] Continuation-in-part of Ser. No. 732,852, May 29, 1968, abandoned.

[52] U.S. Cl. ......260/611 R, 260/611 A, 260/613 R, 260/615 R, 252/364, 252/52 A, 252/351
[51] Int. Cl. ............................................C07c 41/00
[58] Field of Search..................260/615 R, 613 R, 611 R, 611 A

[56] References Cited

UNITED STATES PATENTS 2,778,855  1/1957  Shokal...................................260/615

OTHER PUBLICATIONS

Kharasch et al., Grignard Reactions of Nonmetallic Substances (1954) page 974.

Paguin, Epoxydverbindungen und Epoxydharze (1958) page 2.

*Primary Examiner*—Bernard Helfin
*Attorney*—Richard R. Brainard, Paul A. Frank, Joseph T. Cohen, Charles T. Watts, William A. Teoli, Frank L. Neuhauser, Oscar B. Waddell and Joseph B. Forman

[57] ABSTRACT

Alkyl ethers having 3-hydroxy substitution are produced by the reaction of a mixture of 2-hydrocarbonoxyoxetanes and 3-hydrocarbonoxyoxetanes with a Grignard reagent at temperatures below 100°C. The 3-hydroxy substituted alkyl ethers are useful as solvents in lacquers, and for chemical reactions, as plasticizers and as starting materials for the preparation of polyoxyalkylene ethers by base catalyzed addition of propylene oxide and ethylene oxide. The polyoxyalkylene ethers are useful as lubricants, surfactants, etc.

6 Claims, No Drawings

PROCESS FOR PRODUCING 3-HYDROXYALKYL ETHERS

This is a continuation-in-part of my copending application Ser. No. 732,852, filed May 29, 1968 and now abandoned.

This invention relates to a process for producing 3-hydroxy substituted alkyl ethers by the reaction of a mixture of 2-hydrocarbonoxyoxetanes and 3-hydrocarbonoxyoxetanes with a Grignard reagent at temperatures below about 100°C.

In accordance with the process of the present invention, 3-hydroxy substituted alkyl ethers having the formulas,

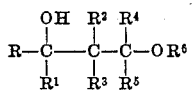

or

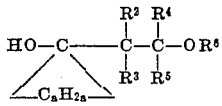

wherein R is an alkyl group containing up to 10 carbon atoms or an aryl group containing up to 12 carbon atoms, $R^1$ is hydrogen or an R group, $R^2$, $R^3$, and $R^4$ are members of the class consisting of hydrogen, monovalent hydrocarbon radicals and halogenated monovalent hydrocarbon radicals, $R^5$ is a monovalent hydrocarbon radical, $R^6$ is an alkyl group containing up to 10 carbon atoms or an aryl group containing up to 12 carbon atoms and $a$ is an integer of from 3 to 13, are produced by the reaction of (1) a mixture of a 2-hydrocarbonoxyoxetane and a 3-hydrocarbonoxyoxetanes and a hydrocarbon magnesium halide of the formula, $$R^5MgX, \quad (3.)$$

where the 2-hydrocarbonoxyoxetane is selected from,

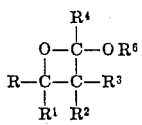

or

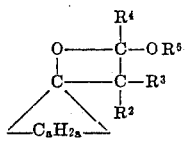

and the 3-hydrocarbonoxyoxetane is selected from,

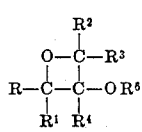

or

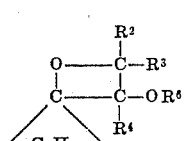

wherein R, $R^1$, $R^2$, $R^3$, $R^4$, $R^6$, and $a$ have the above-defined meanings, wherein $R^5$ is as above-defined and X is halogen, e.g. chlorine, bromine, iodine, etc., at temperatures below 100°C and subsequent hydrolysis of the reaction product.

The reaction of the mixture of the 2-hydrocarbonoxyoxetanes and 3-hydrocarbonoxyoxetanes with hydrocarbon magnesium halides (hereinafter called "Grignard reagents") is believed to take place according to the following equation which for simplicity employs 2-methoxyoxetane and methyl Grignard reagent as the reagents.

A.
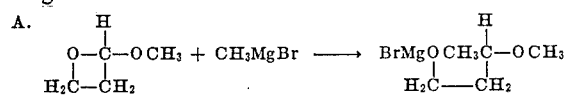

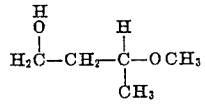

The reaction of the mixture of the 2-hydrocarbonoxyoxetanes and the 3-hydrocarbonoxyoxetanes also can proceed with lithium aluminum hydride according to the following equation which for simplicity shows 2-methoxyoxetanes.

B.
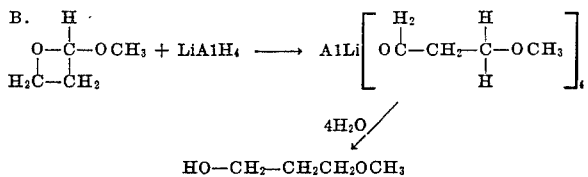

$$HO-CH_2-CH_2CH_2OCH_3$$

As can be seen from the above equations, one equivalent of the hydrocarbonoxyoxetane reacts with each equivalent of the Grignard reagent or lithium aluminum hydride. It is therefore preferred, in the process of this invention, to employ for each equivalent of the hydrocarbonoxyoxetane at least one equivalent of the Grignard reagent or lithium aluminum hydride for completeness of reaction and ease of recovery of the reaction products. It is particularly preferred to employ at least 1.1 equivalents of the Grignard reagent or lithium aluminum hydride for each equivalent of the hydrocarbonoxyoxetane.

In the hydrolysis step of the process of this invention, one employs at least one equivalent of water, or other protic solvent for each equivalent of the organometallic compound produced. It is normal procedure to employ a very large excess of water in order to dissolve the inorganic salts and render the products more readily recoverable.

It is of course apparent where a complex metal hydride such as lithium aluminum hydride is employed in place of the Grignard reagent, hydrogen would be introduced in place of an $R^5$ group in the process of this invention.

The temperature at which the reaction of this invention takes place is not narrowly critical and can vary from as low as 25°C to as high as 100°C. It is preferred to maintain the reaction mixture at from 35°C to 75°C which is the boiling point of the lower ethers employed in the process of this invention. Temperatures higher than the reflux temperature of the mixtures can be employed by employing higher pressure; however, no commensurate advantages are obtained thereby.

The process of the present invention can be conducted at sub-atmospheric, atmospheric, or super-atmospheric pressures. It is preferred, for simplicity and ease of operation, to conduct the process at atmospheric pressure in the liquid phase.

A solvent is normally employed in conducting the process of this invention. The solvent insures a better contact of the reagents, simplifies the apparatus which can be employed and acts as a heat-sink for the heat generated by the reaction, thereby aiding in controlling the temperature of the reaction. The amount of the solvent employed can be, by weight, from 100 to 1,000 parts per 100 parts of the reagents. Solvents which are useful in conducting the process of this invention are those which have heretofore been employed in Grignard reactions. Such solvents are, for example, the dialkyl ethers such as diethyl ether, ethyl methyl ether, dibutyl ether, etc; cyclic ethers such as dioxane, tetrahydrofuran, etc; and glycol diethers such as, ethyleneglycol dimethyl ether, diethyleneglycol dimethyl ether, etc.

The monovalent hydrocarbon radicals which $R^2$, $R^3$, $R^4$, and $R^5$ represent include alkyl radicals such as methyl, ethyl, isopropyl, tertiary butyl, octyl, decyl, etc; alkenyl radicals, such as vinyl, crotyl, allyl, methallyl, decenyl, etc; cycloalkyl radicals, such as cyclopentyl, cyclohexyl, etc; cycloalkenyl radicals, such as, cyclopentenyl, cyclohexenyl, cycloheptenyl, etc; aryl radicals, such as, phenyl, biphenyl, naphthyl, etc; arylalkyl radicals, such as, benzyl, phenylethyl, phenylpropyl, etc; alkaryl radicals, such as, tolyl, xylyl, etc. and the halogen derivatives, thereof, which include, chloromethyl, gamma chloropropyl, bromocyclohexyl, perfluorovinyl, chlorocyclohexyl, trifluoropropyl, pentafluorobutyl, dibromophenyl, pentachlorophenyl, $\alpha, \alpha, \alpha$-trifluoromethylphenyl, etc.

Illustrative of the alkyl groups which R, $R^1$, and $R^6$ represent are, for example, methyl, ethyl, isopropyl, t-butyl, decyl, and the like. Illustrative of the aryl groups which R, $R^1$, and $R^6$ represent are, for example, phenyl, biphenyl, tolyl, xylyl, naphthyl, etc.

Illustrative of the Grignard reagents of formula (3) that can be employed on the process of this invention are, for example, methylmagnesium bromide, ethylmagnesium iodide, butylmagnesium chloride, allylmagnesium bromide, cyclohexylmagnesium chloride, phenylmagnesium bromide, naphthyl magnesium bromide, etc.

Illustrative of the oxetane mixtures which can be employed in the process of this invention are mixtures containing, for example, 4,4-dimethyl-2-methoxyoxetane; 4,4-(para-bromo)diphenyl-2-n-butoxyoxetane; 4-methyl-4-ethyl-2-propoxyoxetane; 4,4-diethyl-3,3-dimethyl-2-n-butoxyoxetane; 3,4-dimethyl-2-methoxyoxetane; 3,4-ethyl-4-phenyl-2-n-butoxyoxetane; 4-phenyl-3-methyl-2-ethoxyoxetane; 4-(para-bromo)phenyl-3-methyl-2-ethoxyoxetane; 2-methoxy-1-oxaspiro-[3.5]nonane; 3-(para-chloro)phenyl-2-ethoxy-1-oxaspiro[3.5]-nonane; 2-methoxy-1-oxaspiro[3.7]undecane; 2,3,3-trimethyl-2-methoxy-1-oxaspiro[3.11]c*l pentadecane*; 2-methyl-2-methoxy-1-oxaspiro[3.5]cnonane; 2-n-butoxy-1-oxaspiro[3.4]octane; 2,3-dimethyl-2ethoxy-oxaspiro[3.5]nonane; 3-phenyl-2-isobutoxy-oxaspiro[3.6]decane; 2-methoxy-1-oxaspiro[3.8]dodecane; etc.

The above 2-hydrocarbonoxyoxetane mixtures are produced in accordance with the process described in my copending application, Ser. No. 671,576, filed Sept. 29, 1967 and now abandoned, and assigned to the same assignee as the present invention, which application, by reference, is made a part of the instant application. The mixture of the 2-hydrocarbonoxyoxetane and the 3-hydrocarbonoxyoxetane can be employed directly to produce the 3-hydroxyalkyl ethers inasmuch as 3-alkoxyoxetanes produced in accordance with the aforementioned copending application are not reactive under the conditions of the process of this invention and can be recovered from the reaction products.

In accordance with the process of the present invention, alkoxyoxetanes can be produced in good yields by irradiating a mixture of a vinyl ether of the formula,

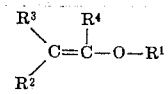

wherein $R^1$ is a monovalent hydrocarbon radical or a halogenated monovalent hydrocarbon radical and $R^2$, $R^3$ and $R^4$ are hydrogen or an $R^1$ group with a carbonyl compound of the formula,

wherein R is a member of the class consisting of alkyl groups containing from one to 18 or more carbon atoms and aryl groups and R' is hydrogen or an R group, or a cycloaliphatic carbonyl compound of the formula, $$C_nH_{2n-2}=0,$$

where $n$ is an integer of from 4 to 18, with ultraviolet light having a wavelength of from 2,000 to 3,700 angstroms.

The complex metal hydrides that can be employed in the process of this invention, are, for example, sodium aluminum hydride, potassium aluminum hydride, rubidium aluminum hydride, cesium aluminum hydride, etc., and mixtures thereof.

The protic solvents that can be employed in the hydrolysis step of this invention include water, alcohols such as, methanol, ethanol, propanol, etc.; acids such as, acetic acid, propanoic acid, etc., ammonia, etc. It is of course obvious that water is the preferred protic solvent for use in the hydrolysis step.

The 3-hydroxyethers produced by the process of this invention are useful as solvents or chemical reactions and as starting materials for the preparation of hydroxyl-terminated polyoxyalkylene ethers by the boron trifluoride addition of cyclic oxides such as, ethylene oxide, propylene oxide, etc. The polyoxyalkylene ethers are useful as lubricants for steel on steel, as surfactants, etc. The hydroxyethers can also be reacted with alkoxy-containing organosilicon compounds by the process described in U.S. Pat. No. 2,917,480, which compositions are useful as surfactants in the preparation of flexible polyether urethane foams by known methods.

The following examples serve to further illustrate this invention. In the examples, all parts and percentages are by weight unless otherwise expressly set forth.

EXAMPLE 1

A mixture (60 grams) consisting of 25 percent of 4-phenyl-2-ethoxyoxetane and 75 percent of 2-phenyl-3-ethoxyoxetane dissolved in 100 ml of diethylether was added to excess methylmagnesium iodide prepared by reacting 5 grams magnesium with 28 grams of methyliodide in 200 ml of diethylether. The resulting mixture was heated to reflux (approximately 38°C) for 30 minutes, cooled, and then poured into a mixture of ice and dilute hydrochloric acid. The ethereal layer was collected, washed with sodium bicarbonate solution and brine and the ethereal solution then dried over magnesium sulfate. Distillation of the ethereal solution yielded unreacted 2-phenyl-3-ethoxyoxetane and 1-phenyl-3-ethoxy-1-butanol (b.p. 80°C/0.1 mm Hg, $n_D^{20}$ 1.5000). The butanol derivative gave the following analysis:

Calculated: mol. wt., 194.26; C, 74.19 percent; H, 9.34 percent

Found: mol. wt., 193; C, 74.38 percent; H, 9.37 percent.

EXAMPLE 2

A mixture (60 grams) consisting of 28 percent of 4,4-dimethyl-2-ethoxyoxetane and 72 percent of 2,2-dimethyl-3-ethoxyoxetane was dissolved in 150 ml of diethyl ether and added to an excess of phenyl magnesium bromide prepared as in Example 1. The resulting mixture was refluxed for 30 minutes at about 38°C. The mixture was cooled and poured into a mixture of ice and dilute hydrochloric acid to decompose the excess phenyl magnesium bromide. The ethereal layer was washed with an aqueous solution of sodium bicarbonate and brine and dried over magnesium sulfate. Distillation of the dried ethereal solution yielded 22.6 grams of 4-ethoxy-4-phenyl-2-methyl-2-butanol (b.p. 57°C/0.05 mm Hg, $n_D^{20}$ 1.4900). The substituted butanol gave the following analysis:

Calculated: mol. wt., 208.29; C, 74.96 percent; H, 9.68 percent

Found: mol. wt., 213; C, 75.15 percent; H, 9.74 percent.

EXAMPLE 3

A mixture consisting of 30 percent of 4,4-dimethyl-2-ethoxyoxetane and 70 percent of 2,2-dimethyl-3-ethoxyoxetane was refluxed with excess lithium aluminum hydride in an excess of diethyl ether for 7 hours. The excess lithium aluminum hydride was then decomposed by adding acetone, methanol and water and the ether solution was separated and dried over magnesium sulfate. The 3-ethoxyoxetane was recovered unchanged by distillation which also yielded (3-methyl-3-hydroxy)butyl ethyl ether, b.p. 74.5°C/19 mm Hg, $n_D^{20}$ 1.4172. The hydroxy-substituted butyl ethyl ether gave the following analysis:

Calculated: mol. wt., 132.20; C, 63.59 percent; H, 12.20 percent

Found: mol. wt., 139; C, 63.44 percent; H, 12.4 percent.

EXAMPLE 4

A solution of 4,4-dimethyl-2-n-butoxyoxetane (10 grams) in diethyl ether (4 ml.) was added to lithium aluminum hydride (2 grams) and dissolved in 100 ml. of diethyl ether. The resulting mixture was gently refluxed at approximately 38°C for 5 hours. The excess lithium aluminum hydride was decomposed by adding to the reaction mixture acetone, methanol and water and separating the ether solution. The ethereal solution was dried over magnesium sulfate. The dried ethereal solution was distilled under vacuum to yield 2-methyl-4-n-butoxy-2-butanol (8 grams), b.p. 60°C/2.8 mm Hg, $n_D^{20}$ 1.4243. The substituted butanol gave the following analysis:

Calculated: mol. wt., 160.25; C, 67.45 percent; H, 12.58 percent

Found: mol. wt., 165; C, 67.32 percent; H, 12.33 percent.

Under the same conditions, 2,2-dimethyl-3-n-butoxyoxetane was not reduced.

EXAMPLE 5

A mixture (60 grams) consisting of 27 percent of 2-ethoxy-1-oxaspiro[3.5]nonane and 73 percent of 3-ethoxy-1-oxaspiro[3.5]-nonane dissolved in 200 ml. of diethyl ether was added to an excess of lithium aluminum hydride (4.4 grams) in 250 ml. of ether. The solution was gently refluxed for 6 hours at approximately 38°C. The excess lithium aluminum hydride was decomposed by adding acetone, methanol and water and the ethereal layer separated. The ethereal layer was dried over magnesium sulfate. Distillation yielded the 3-ethoxy-oxaspiro[3.5]nonane unchanged and 1-($\beta$-ethoxy)ethyl-1-hydroxy-cyclohexane (b.p. 52°C/0.2 mm Hg, $n_D^{20}$ 1.4588). The cyclohexane derivative gave the following analysis:

Calculated: mol. wt., 168.28; C, 71.37 percent; H, 11.98 percent

Found: mol. wt., 169; C, 69.91 percent; H, 11.59 percent.

EXAMPLE 6

A mixture (50 grams) containing 25 percent of 4-phenyl-2-ethoxyoxetane and 75 percent of 2-phenyl-3-ethoxyoxetane was refluxed with lithium aluminum hydride (4 grams) in 400 ml. or diethyl ether for 6 hours. The excess lithium aluminum hydride was decomposed by adding acetone, methanol and water and the ethereal solution separated, and dried over magnesium sulfate. Distillation yielded the 3-ethoxyoxetane unchanged and 1-phenyl-3-ethoxy-1-propanol (13.1 grams), b.p. 76°C/0.2 mm Hg, $n_D^{20}$ 1.0572. Elemental analysis of the 1-propanol gave the following results:

Calculated: mol. wt., 180.24; C, 73.3 percent; H, 8.95 percent

Found: mol. wt., 178; C, 73.23 percent; H, 9.67 percent.

EXAMPLE 7

A solution of 4,4-dimethyl-2-n-butoxyoxetane (10 grams) in diethyl ether (50 ml.) was added slowly to an excess of methyl magnesium iodide (prepared from 17.7 grams of methyl iodide and 3.0 grams of magnesium in 12 ml. of diethyl ether) at such a rate that the ether solution was kept at a gentle reflux (approximately 38°C). When the addition was complete, the reaction mixture was refluxed for an additional 30 minutes, cooled and poured into a mixture of ice, water and dilute hydrochloric acid. The ethereal layer was washed with aqueous sodium bicarbonate and brine and then dried over magnesium sulfate. Distillation of the dried ethereal solution yielded 2-methyl-4-butoxy-2-pentanol (9.07 grams, b.p. 75°C/5 mm Hg, $n_D^{20}$ 1.4218). The substituted butanol gave the following analysis:

Calculated: mol. wt., 174.28; C, 68.81 percent; H, 12.72 percent

Found: mol. wt., 177; C, 68.75 percent; H, 12.85 percent.

The isomeric 2,2-dimethyl-3-n-butoxyoxetane did not react under the same conditions of this experiment.

EXAMPLE 8

A mixture (60 grams) consisting of 27 percent of 2-ethoxy-1-oxaspiro[3.5]nonane and 73 percent of 3-ethoxy-1-oxaspiro[3.5]nonane dissolved in 150 ml. of diethyl ether was added to an excess of methyl magnesium iodide prepared as in Example 7. The reaction mixture was refluxed for 30 minutes, cooled and poured into a mixture of ice, water and dilute hydrochloric acid. Distillation of the ethereal solution yielded the 3-ethoxyoxetane unchanged and 1-(β-ethoxy)propyl-1-hydroxyl-cyclohexane (b.p. 76°C/2.2 mm Hg, $n_D^{20}$ 1.4526). The cyclohexanol derivative gave the following analysis:

Calculated: mol. wt., 186.29; C, 70.92 percent; H, 11.90 percent

Found: mol. wt., 190; C, 70.75 percent; H, 11.77 percent.

It will of course be apparent to those skilled in the art that 2-hydrocarbonoxy-substituted-oxetanes other than those listed in the above examples and hydrocarbon magnesium halides, and other complex metal hydrides, other than those listed in the examples in the same and different proportions can be employed in the process of this invention and substituted in the examples above without departing from the scope hereof.

I claim:

1. A process for the production of 3-hydroxy alkyl ether of the formula,

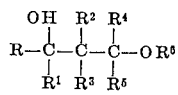

which comprises (1) effecting reaction at a temperature below 100°C between a mixture of a 2-hydrocarbonoxetane and a 3-hydrocarbonoxyoxetane and a hydrocarbon magnesium halide of the formula, $$R^5MgX,$$

and (2) hydrolyzing the resulting reaction product of (1), where the 2-hydrocarbonoxyoxetane has the formula,

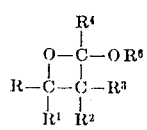

and the 3-hydrocarbonoxetane has the formula,

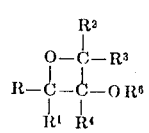

wherein R is an alkyl group containing up to 10 carbon atoms or an aryl group containing up to 12 carbon atoms, $R^1$ is hydrogen or an R group, $R^2$, $R^3$ and $R^4$ are members of the class consisting of hydrogen, monovalent hydrocarbon radicals and halogenated monovalent hydrocarbon radicals, $R^5$ is a monovalent hydrocarbon radical and $R^6$ is an alkyl group containing up to 10 carbon atoms or an aryl group containing up to 12 carbon atoms.

2. A process as in claim 1, wherein the 2-hydrocarbonoxyoxetane is 4-phenyl-2-ethoxyoxetane and the hydrocarbon magnesium halide is methylmagnesium iodide.

3. A process as in claim 1, wherein the 2-hydrocarbonoxyoxetane is 4,4-dimethyl-2-ethoxyoxetane and the hydrocarbon magnesium halide is phenylmagnesium bromide.

4. A process as in claim 1, wherein the 2-hydrocarbonoxyoxetane is 4,4-dimethyl-2-n-butyloxetane and the hydrocarbon magnesium halide is methylmagnesium iodide.

5. A process for the production of 3-hydroxy alkyl ether of the formula,

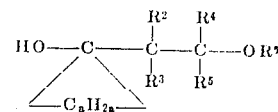

which comprises (1) effecting reaction at a temperature below 100°C between a mixture of a 2-hydrocarbonoxyoxetane and a 3-hydrocarbonoxyoxetane and a hydrocarbon magnesium halide of the formula, $$R^5MgX,$$

and (2) hydrolyzing the resulting reaction product of (1), where the 2-hydrocarbonoxyoxetane has the formula,

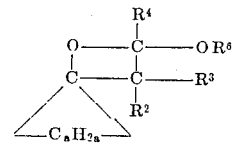

and the 3-hydrocarbonoxyoxetane has the formula,

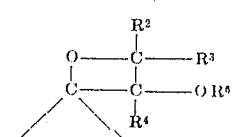

wherein $R^2$, $R^3$ and $R^4$ are members of the class consisting of hydrogen, monovalent hydrocarbon radicals and halogenated monovalent radicals, $R^5$ is a monovalent hydrocarbon radical, $R^6$ is an alkyl group containing up to 10 carbon atoms, or an aryl group containing up to 12 carbon atoms, and $a$ is an integer of from 3 to 13.

6. A process as in claim 5, wherein the 2-hydrocarbonoxyoxetane is 2-ethoxy-1-oxaspiro[3.5]nonane and the hydrocarbon magnesium halide is methylmagnesium iodide.

* * * * *